United States Patent
Miyazoe

(10) Patent No.: US 7,328,720 B2
(45) Date of Patent: Feb. 12, 2008

(54) SOLENOID VALVE

(75) Inventor: Shinji Miyazoe, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 303 days.

(21) Appl. No.: 11/231,981

(22) Filed: Sep. 22, 2005

(65) Prior Publication Data

US 2006/0081802 A1 Apr. 20, 2006

(30) Foreign Application Priority Data

Oct. 15, 2004 (JP) .............................. 2004-301967

(51) Int. Cl.
*F16K 11/20* (2006.01)

(52) U.S. Cl. ................. 137/596.16; 137/884; 137/271; 137/625.64

(58) Field of Classification Search ........... 137/596.16, 137/884, 560, 269, 271, 625.64; 251/129.03, 251/26

See application file for complete search history.

(56) References Cited

U.S. PATENT DOCUMENTS

| 5,664,604 | A | * | 9/1997 | Sato et al. ................... 137/884 |
| 6,213,153 | B1 | * | 4/2001 | Hayashi et al. ............. 137/884 |
| 6,216,740 | B1 | * | 4/2001 | Hayashi et al. ............. 137/884 |
| 6,505,642 | B2 | * | 1/2003 | Miyazoe et al. ............ 137/554 |
| 6,520,202 | B2 | * | 2/2003 | Miyazoe et al. ............ 137/554 |
| 6,612,332 | B2 | * | 9/2003 | Miyazoe et al. ............ 137/552 |

FOREIGN PATENT DOCUMENTS

| JP | 9-310782 | 12/1997 |
| JP | 9-317929 | 12/1997 |
| JP | 2002-39418 | 2/2002 |

* cited by examiner

*Primary Examiner*—John Rivell
*Assistant Examiner*—Craig M. Schneider
(74) *Attorney, Agent, or Firm*—Oblon, Spivak, McClelland, Maier & Neustadt, P.C.

(57) ABSTRACT

To construct solenoid valves used as a solenoid assembly by assembling the solenoid valves in a group so that both collective wiring and individual wiring can be performed and the solenoid valves can be simultaneously cut off from a collective wiring power supply and an individual wiring power supply. An individually receiving connector for connecting an individual feeding connector, a switching member being able to be freely shifted between a first operational position where the connection of the individual feeding connector to the individual receiving connector is prohibited and a second operational position where the connection is allowed, and a switch operating in response to operation of the switching member are provided in a solenoid valve connected to a power supply by collective wiring. When the switching member is shifted to the first operational position, the switch switches a control circuit to the collective wiring connection, and, when the switching member is shifted to the second operational position, the switch switches the control circuit to the individual wiring connection.

6 Claims, 10 Drawing Sheets

SOLENOID VALVE

TECHNICAL FIELD

The present invention relates to a solenoid valve appropriate for use in the form of a solenoid valve assembly by grouping the solenoid valve and more particularly to a solenoid valve in the grouping of which collective wiring and individual wiring can be performed.

PRIOR ART

Up to now, the technology using a plurality of solenoid valves in the form of a solenoid valve assembly by grouping the solenoid valves is publicly known as disclosed in Patent Document 1 and Patent Document 2. In such a solenoid valve assembly, generally a collective wiring system is introduced and collective feeding to each solenoid valve is performed through a feeding block, etc., put into the assembly.

In Patent Document 1 and Patent Document 2, a case in which a solenoid valve assembly is constituted by connecting a plurality of manifold bases having a solenoid valve mounted therein in a connected row arrangement is disclosed. In each of the manifold bases, a collective wiring connector by which the manifold bases are connected to each other is provided, a branch connector branched from the collective wiring connector is provided, and the collective wiring connector is connected to a power supply through a feeding block provided at the end portion of the solenoid valve assembly. Furthermore, in the solenoid valve, a receiving connector to be connected to the branch connector when the solenoid valve is mounted on the manifold base is provided, and a current is fed from the collective wiring connector to each solenoid valve through the receiving connector and the branch connector.

In such a solenoid valve assembly, since each solenoid valve is connected in a collective wiring state, it is difficult to individually perform operational test of each solenoid valve.

Then, in Patent Document 3, a solenoid valve manifold is proposed to solve such a problem. The solenoid valve manifold is constructed in such a way that, in addition to an input terminal for the main power supply for collective wiring, an input terminal for an external power supply is provided in each solenoid valve and a current can be individually fed to each solenoid valve by connecting a feeding connector from the external power supply to the input terminal for an external power supply. That is, although the solenoid valve is normally connected to the main power supply, when the feeding connector from an external power supply is connected to the input terminal for an external power supply, the contact in the circuit is pressed by the feeding connector and made open-circuited, and, as a result, the solenoid valve is cut off from the main power supply and connected to the external power supply. Then, when the feeding connector is removed, the contact is closed-circuited and the solenoid valve is cut off from the external power supply and once again connected to the main power supply.

Japanese Unexamined Patent Application Publication No. 9-310782

Japanese Unexamined Patent Application Publication No. 9-317929

Japanese Unexamined Patent Application Publication No. 2002-39418

DISCLOSURE OF INVENTION

However, in the solenoid valve manifold described in Patent Document 3, when the feeding connector from an external power supply is not connected to the input terminal for an external power supply, each solenoid valve is connected to the main power supply; when the feeding connector is connected to the input terminal, the solenoid valve is cut off from the main power supply and connected to the external power supply; and when the feeding connector is removed, the solenoid valve is once again connected to the main power supply. In this way, the solenoid valve is always connected to either the main power supply or the external power supply. Accordingly, when a particular solenoid valve out of a plurality of solenoid valves in a group is required to be cut off from both the main power supply and the external power supply, there is no way to cope with the problem.

Then, it is an object of the present invention to construct solenoid valves to be used as a solenoid assembly by assembling the solenoid valves in a group so that both collective wiring and individual wiring can be performed and the solenoid valves can be simultaneously cut off from a collective wiring power supply and an individual wiring power supply.

In order to attain the above object, a solenoid valve of the present invention comprises a main valve portion for switching a fluid flow path by operation of a valve member; a solenoid operation portion for making the valve member operate by a magnetic force generated by passing a current through an excitation coil; a control circuit having a collective wiring terminal portion connected to a power supply by collective wiring and an individual wiring terminal portion connected to the power supply by individual wiring, the control circuit being connected to the excitation coil; an individual receiving connector connected to the individual wiring terminal portion, the individual receiving connector being connected to an individual feeding connector from the power supply when individual wiring is performed; a switching member being able to be freely shifted between a first operational position where the connection of the individual feeding connector to the individual receiving connector is prohibited and a second operational position where the connection is allowed; and a switch operating in response to operation of the switching member, the switch for switching the control circuit to the collective wiring connection when the switching member is shifted to the first operational position and for switching the control circuit to the individual wiring connection when the switching member is shifted to the second operational position.

Furthermore, in a solenoid valve of the present invention, when the switching member is shifted to the second operational position and the individual feeding connector is connected to the individual receiving connector, the switching member is locked at the second operational position.

In the present invention, preferably the switch is a mechanical switch having an operator; the switching member is provided on the outer surface of a solenoid valve so as to be freely lineally shifted between the first operational position and the second operational position; when the switching member is shifted to the first operational position, the individual receiving connector is covered by the switching member and the connection of the individual feeding connector is prohibited and simultaneously the operator of the switch is switched to a first connecting position to switch the control circuit to the collective wiring connection; and, when the switching member is shifted to the second operational position, the individual receiving connector is made open-circuited and the connection of the individual feeding connector is allowed and simultaneously the operator of the switch is switched to a second connecting position to switch the control circuit to the individual wiring connection.

Moreover, according to one concrete construction (structure) of a solenoid valve of the present invention, in the solenoid valve, a collective terminal relay connector for collective wiring, in which a plurality of solenoid valves connected in a connected row arrangement is electrically connected to each other, is contained, and a part of terminals of the relay connector is connected to the collective wiring terminal portion.

Furthermore, according to another concrete construction of a solenoid valve of the present invention, in the solenoid valve, a collectively receiving connector electrically connected to the collective wiring terminal portion is contained, and, when the collectively receiving connector is mounted on a manifold base, the collectively receiving connector is connected to a collective feeding connector on the manifold base.

According to the present invention, when the switching member is shifted to the first operational position, the connection of the individual feeding connector to the individual receiving connector is prohibited and the control circuit is switched to the collective wiring connection by the switch; and when the switching member is shifted to the second operational position, the connection of the individual feeding connector to the individual receiving connector is allowed and the control circuit is switched to the individual wiring connection by the switch. Accordingly, both collective wiring and individual wiring of the solenoid valves can be performed.

Moreover, in the state where the switching member is shifted to the second operational position, although the control circuit is released from the collective wiring connection and switched to the individual wiring connection, while the individual feeding connector is not connected to the individual receiving connector, the solenoid valves are not connected to the individual wiring power supply. Therefore, the solenoid valves can be simultaneously cut off from both the collective wiring power supply and the individual wiring power supply.

BEST MODE FOR CARRYING OUT THE INVENTION

Figure 1:
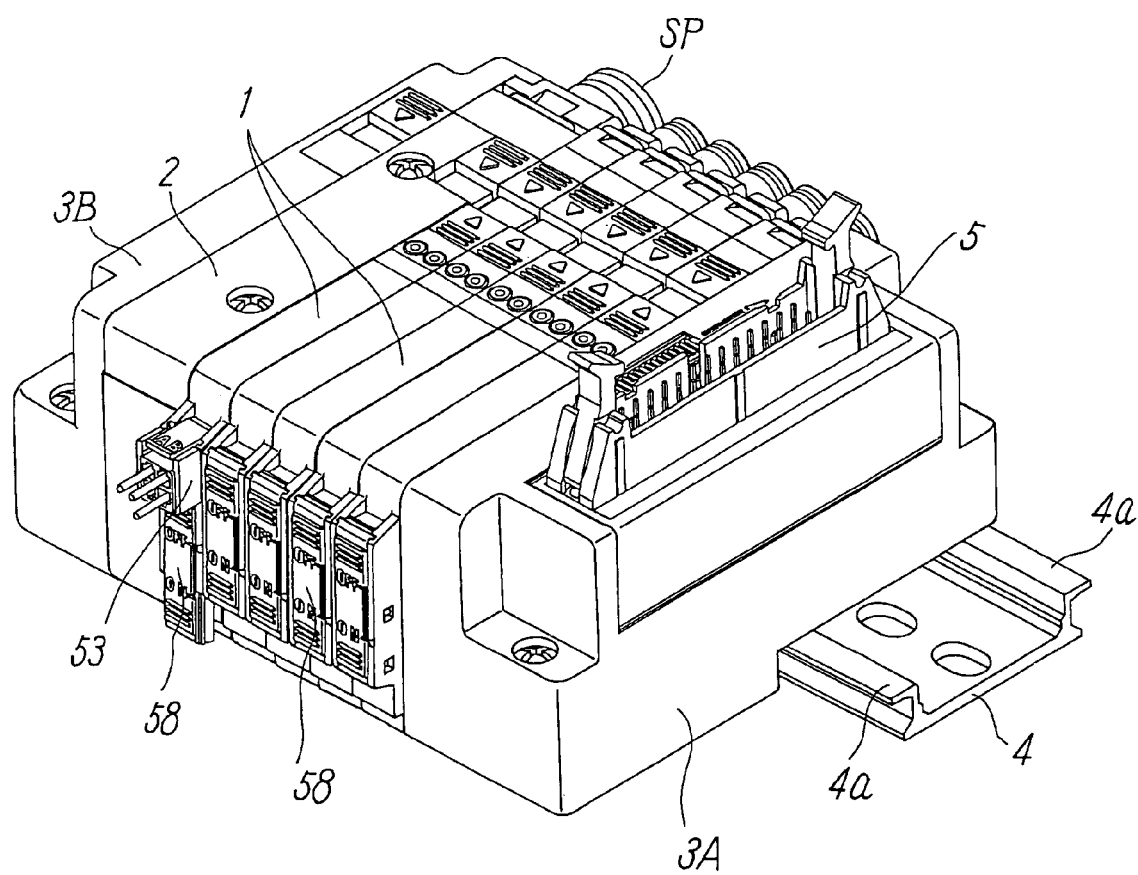
FIG. 1 is a perspective view showing a solenoid valve assembly in which a plurality of solenoid valves according to the present invention is connected in a connected row arrangement.
Figure 2:
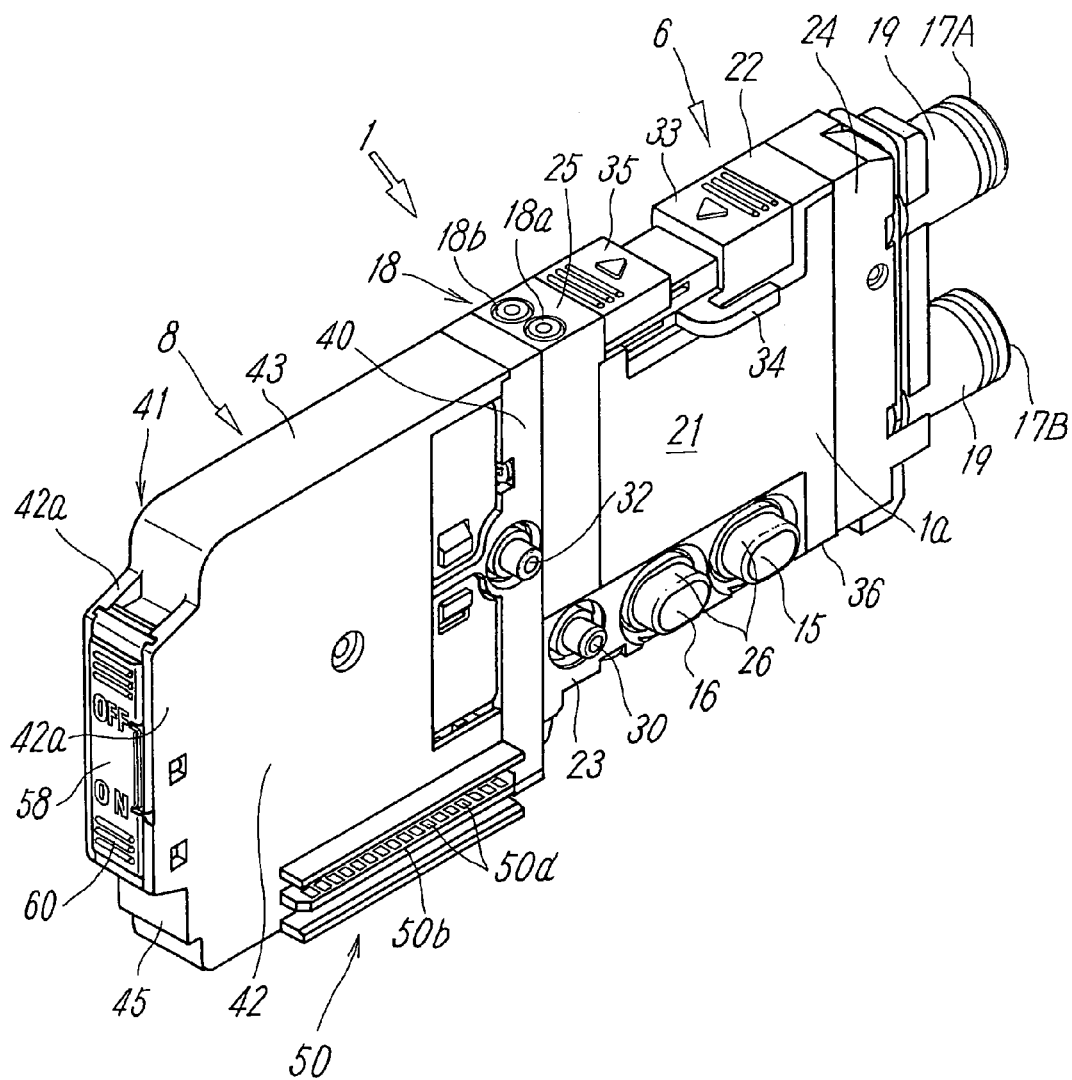
FIG. 2 is a perspective view of a solenoid valve used in FIG. 1.

FIG. 1 shows one example in which a solenoid valve assembly is formed by grouping a solenoid valve according to the present invention. Reference numeral 1 represents a solenoid valve, reference numeral 2 represents an air-supply and air-exhaust block for performing air supply to and air exhaust from each solenoid valve 1 in a group, reference numerals 3A and 3B represent end blocks at both ends in a line of the solenoid valves 1 and the air-supply and air-exhaust block 2, and reference numeral 4 represents a rail on which the above are mounted. Out of the end blocks 3A and 3B, one end block 3A, which doubles as a power supply block, contains an integrated-terminal base connector 5 as a base point for collective wiring and the base connector 5 is an integrated-terminal relay connector 50 (see FIG. 2) which is provided in each solenoid valve 1 and connected from solenoid valve to solenoid valve in order, and thus, collective wiring to each solenoid valve 1 from the base connector 5 as a base point through the relay connector 50 is performed. Furthermore, in the air-supply and air exhaust block 2, a pipe joint is connected, an air-supply port and an air-exhaust port are provided, and air is collectively supplied to each solenoid valve from the air-supply port SP.

FIGS. 2 to 5 show an example of a concrete structure of the above solenoid valve 1. The solenoid valve 1, of which a plurality of solenoid valves are connected in a collected row arrangement, contains a main valve portion 6, in which air flow paths are switched by a spool 7 and a pilot-operated solenoid operation portion 8 connected to one end side in the axial direction (length direction) of the main valve portion 6; and the solenoid valve 1 is a double pilot-operated solenoid valve in which the spool 7 is driven by controlling pilot air by two pilot valves 9a and 9b of the solenoid operation portion 8. Furthermore, on both side faces in the valve width direction (transverse width direction) of the solenoid valve 1, a first connection surface 1a and a second connection surface 1b, both of which are substantially flat, to be connected related equipment such as other solenoid valves, the air-supply and air-exhaust block 2, the end blocks 3A and 3B, or others are contained.

The above main valve portion 6 having a five-port valve structure contains a valve hole 10 extending in the axial direction; five air openings 11, 12A, 12B, 13A, and 13B for air supply, output, and air exhaust, which are formed at different locations in the valve hole 10; the above spool 7 for switching air flow paths between the air openings by being inserted into the above valve hole 10 so as to freely slide; two pistons 14a and 14b in contact with both ends in the axial direction of the spool 7, respectively, driven by pilot air supplied by the solenoid operation portion 8, and for switching the spool 7; a plurality of through holes 15 and 16 in a connected row arrangement which is made to pass through the main valve portion 6 in the valve width direction; two output ports 17A and 17B provided on the end face, opposite to the side where the valve operation portion 8 of the main valve portion 6 is connected; and a manual operation portion 18 having two manual buttons 18a and 18b by which the spool 7 can be switched.

In the example shown in the drawings, the two through holes 15 and 16 are provided, and one through hole 15 is for supplying main air and the other through hole 16 is for exhausting main air. Then, the supply through hole 15 is connected to the supply air opening 11 through a branch hole 15a, and the exhaust through hole 16 is connected to the two exhaust air openings 13A and 13B through branch holes 16a and 16b. Furthermore, the two output ports 17A and 17B are separately connected to the output air openings 12A and 12B through output holes (not illustrated). Quick-connection type joints 19 are attached to the output ports 17A and 17B.

The housing 20 of the main valve portion 6 is divided into a plurality of blocks. That is, a center block 21 positioned in the middle of the housing 20, a top block 22 connected to the upper end portion of the center block 21, a bottom block 23 connected to the lower end portion, an output block 24 connected to a first end side in the axial direction (length direction) of the center block 21, a manual block 25 connected to a second end side on the opposite side are contained, and the above housing 20 is formed of these blocks so as to have a substantially rectangular and longitudinal sectional shape as a whole. Then, the valve hole 10 extending in the axial direction is formed inside the center block 21, and the through holes 15 and 16 are formed in the bottom block 23. Accordingly, the bottom block 23 has substantially the same function as the divided type manifold base.

The through holes 15 and 16 contain connecting pipes 26 protruding on the side of the first connection surface 1a and ring-shaped seal members attached inside the through holes on the side of the second connection surface 1b, respectively, and, when a plurality of solenoid valves 1 are connected in a connected row arrangement, the corresponding through holes 15 and 16 are air-tightly connected in such a way that the connecting pipe 26 and the seal member of the neighboring solenoid valves are joined.

Moreover, in the bottom block 23, a pilot air supply through hole 30 passing through in the valve width direction is also formed, and the pilot air-supply through hole 30 is linked to the two pilot valves 9a and 9b of the solenoid operation portion 8 and the manual operation portion 18, respectively, through a pilot branch hole (not illustrated). Then, also in the pilot air-supply through hole 30, a connecting pipe and a seal member are provided in such a way that the connecting pipe and the seal member of neighboring solenoid valves are air-tightly joined in the same way as in the above through holes 15 and 16.

In the output block 24 and the manual block 25, piston rooms are formed, and the pistons 14a and 14b are held in the respective piston rooms. Furthermore, pilot pressure rooms 31a and 31b are provided on the back of the pistons 14a and 14b, respectively, and the pilot pressure rooms 31a and 31b are linked to one of the pilot valves 9a and 9b and the pilot air-supply through hole 30 corresponding to one of the manual buttons 18a and 18b by way of an individual pilot output path a general view of which is omitted. In the example shown in the drawings, although the diameters of the two pistons 14a and 14b are different, and the first piston 14a is larger in diameter than the second piston 14b, the pistons may be the same in diameter.

Figure 3:
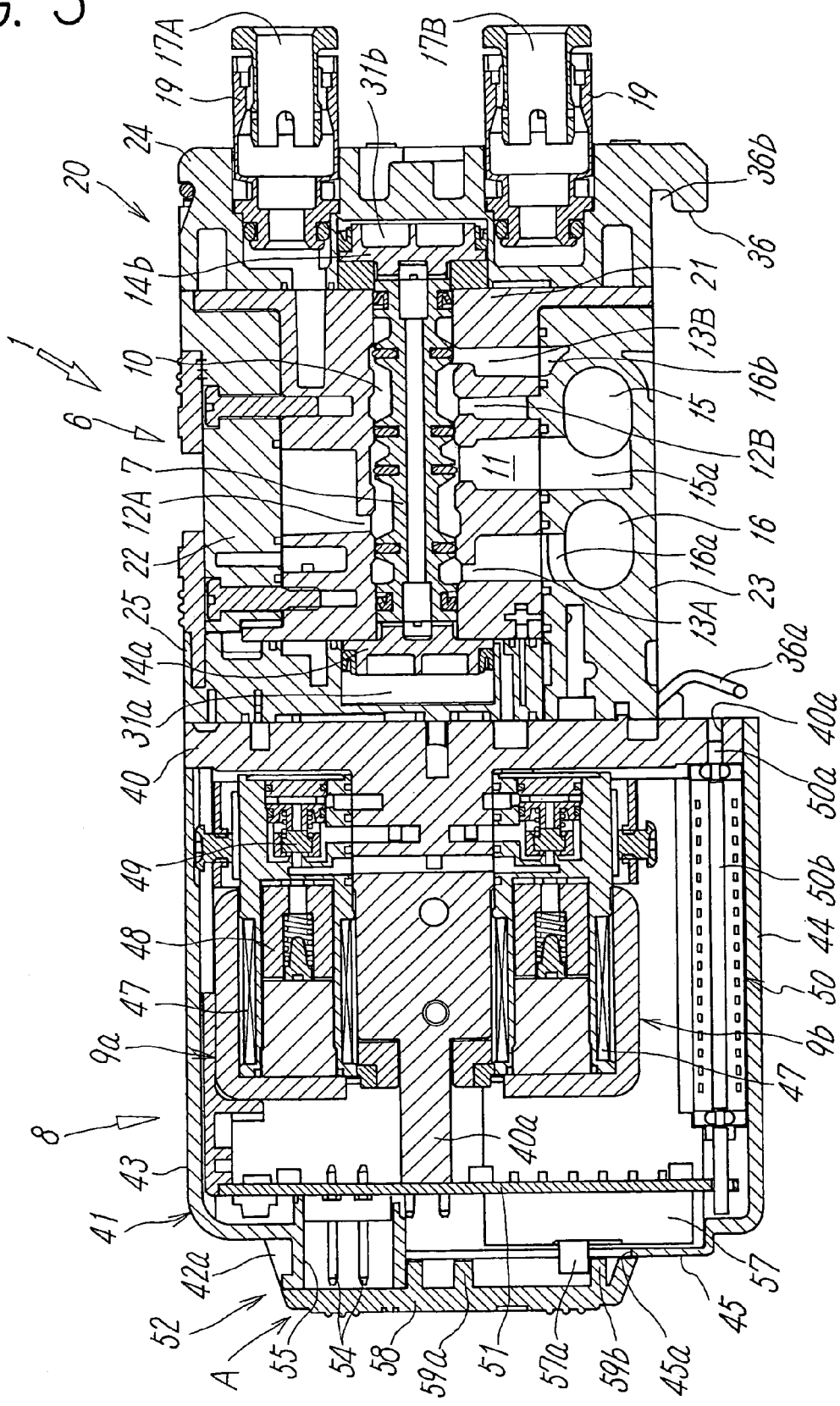
FIG. 3 is a sectional view of the solenoid valve in FIG. 2.
Figure 4:
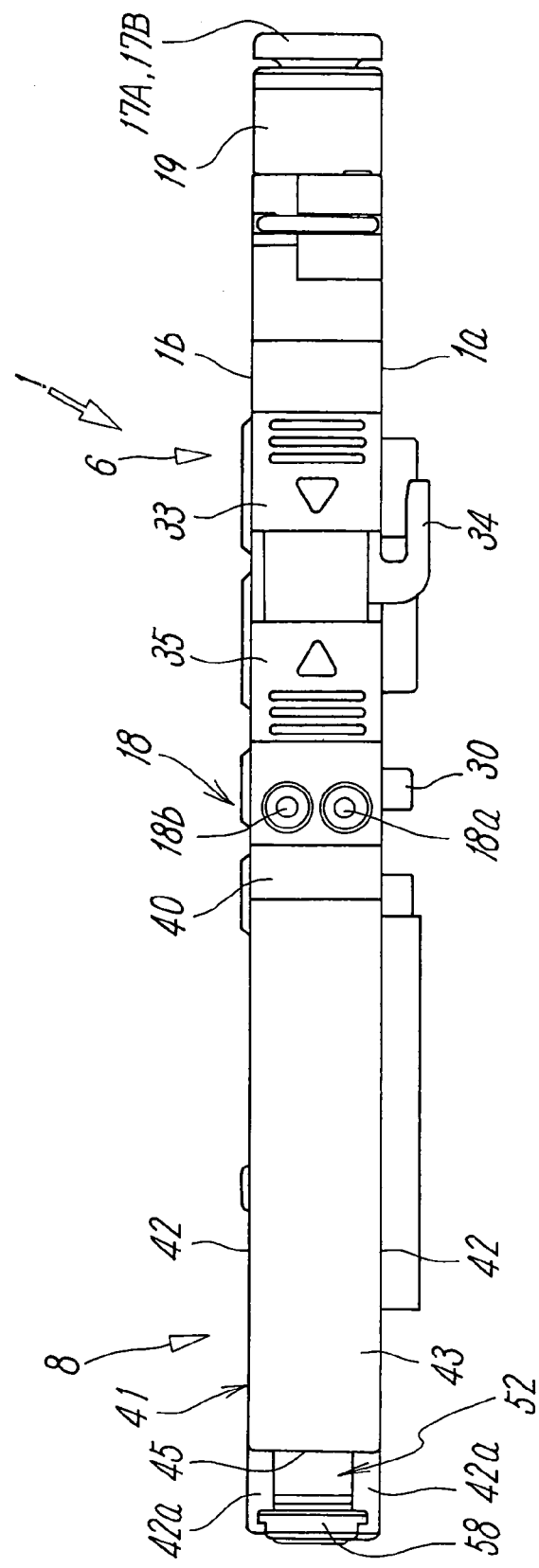
FIG. 4 is a top view of the solenoid valve in FIG. 3.

Then, when the first pilot valve 9a, on the one hand, operates and pilot air is supplied to the first pilot pressure room 31a, the spool 7 is moved to a first change-over position in FIG. 3 by the action of the first piston 14a, the supply air opening 11 and the second output air opening 12B are linked and air output is taken out from the second output part 17B, and, at the same time, the first output air opening 12A and the first exhaust air opening 13A are linked and the first output port 17A becomes in an air-exhausted state. In contrast with this, when the second pilot valve 9b, on the other hand, operates and pilot air is supplied to the second pressure room 31b, the spool 7 is moved to a first change-over position, opposite to that in FIG. 3, by the action of the second position 14b, the supply air opening 11 and the first output air opening 12A are linked and air output is taken out from the first output port 17A, and, at the same time, the second output air opening 12B and the second exhaust output opening 13B are linked and the second output port 17B becomes in an air-exhausted state.

The manual operation portion 18 is for reproducing the change-over state by the pilot valves 9a and 9b by the manual operation and contains the two manual buttons 18a and 18b arranged in the valve width direction on the upper surface of the manual block 25. The first manual button 18a corresponds to the first pilot valve 9a and the second manual button 18b corresponds to the second pilot valve 9b. Then, when the first manual button 18a is pressed down, the pilot air-supply through hole 30 is directly linked to the first pilot pressure room 31a without passing through the first pilot valve 9a, and when the second manual button 18b on the other hand is pressed down, the pilot air-supply through hole 30 is directly linked to the second pilot pressure room 31b without passing through the second pilot valve 9b.

In the top block 22, a hook 34 is provided so that, when a plurality of solenoid valves 1 are connected in a connected row arrangement on the side of the connection surface 1a on the one hand, neighboring solenoid valves may be latched together, and, on the side of the connector surface 1b on the other hand, a joining hole (not illustrated) to which the hook 34 of neighboring solenoid valves is joined is provided. The hook 34 is provided in a connecting member 33 which is attached to the block 22 so as to freely slide, and the hook 34 is engaged with and removed from the joining hole freely by making the connecting member 33 slide.

In the drawing, reference numeral 35 represents a safety member provided next to the connecting member 33, and, when the solenoid valves 1 are not latched together by the connecting member 33, the manual buttons 18a and 18b are locked so as not to be operated.

On the lower surface of the main valve portion 6, a concave rail attachment portion 36 to which a rail 4 can be joined is formed, and the solenoid valve 1 is mounted on the rail 4 by latching both side ends of the rail 4 to a rail clip 36a and a concave groove 36b of the rail attachment portion 36. The rail is a DIN rail.

The solenoid operation portion 8 contains a synthetic-resin adapter block 40 connected to the housing 20 of the main valve portion 6. The adapter block 40 contains a center base 40a integrally formed therewith and extending at a right angle from the intermediate position of the adapter block 40, the first pilot valve 9a and the second pilot valve 9b are disposed on the upper and lower surfaces of the center base 40a so that their axial lines may be in parallel, and both the pilot valves 9a and 9b are attached by using screws so as to be removable. Furthermore, the external surface of the solenoid operation portion 8 is covered by a cover 4a so as to be freely attachable and removable. The cover 41 in which the end face on the side of the adapter block 40 is made open is square column-shaped; the cover 41 contains left and right side wall portions 42 and 42 for covering both left and right side faces of the solenoid operation portion 8, an upper wall portion 43 and a lower wall portion 44 for covering both upper and lower surfaces, respectively, and an end wall portion 45 for covering the front end surface as one end in the axial direction; and the cover 41 is attachable to and removable from the adapter block 40 in the axial direction.

The pilot valves 9a and 9b having the same structure contain an excitation coil 47, a moving core to be displaced by a magnetic force generated when a current is passed through the excitation coil 47, and a valve member 49 for opening and closing the pilot valve seat by being driven by the moving core. Then, the output port of the first pilot valve 9a is linked to the first pilot pressure room 31a, the output port of the second pilot valve 9b is linked to the second pilot pressure room 31b, and the input ports of the pilot valves 9a and 9b are commonly linked to an exhaust through hole 32. Accordingly, when a current is passed through the first pilot valve 9a, pilot air from the pilot supply through hole 30 is supplied to the first pilot pressure room 31a to drive the first piston 14a, and, when a current is passed through the second pilot valve 9b, pilot air from the pilot supply through hole 30 is supplied to the second pilot pressure room 31b to drive the second piston 14b.

Moreover, since the structure itself of such pilot valves 9a and 9b is publicly known, a more detailed description of the structure than the above is omitted.

Furthermore, in the lower end portion of the solenoid operation portion 8, the above collective terminal relay connector 50 for collective wiring is provided by inserting an attachment portion 50a at one end of the relay connector 50 into an attachment hole 40a at the lower end of the adapter block 40. The relay connector 50, shared for power supply and for signal transmission, contains a plate-like convex portion 50b protruding on the side of the first connection surface 1a of the solenoid valve 1 and a groove-like concave portion 50c made open on the side of the second connection surface, a plurality of insertion-side terminals 50d are provided on the upper and lower surfaces of the convex portion 50b, and a plurality of reception-side terminals are provided on the inner surface of the concave portion 50c. Then, when a plurality of solenoid valves 1 are connected, the insertion-side terminals 50d and the reception-side terminals are connected in order in such a way that the convex portion 50b and the concave portion 50c of neighboring solenoid valves are joined together, and a current is collectively passed to each solenoid valve 1 from the base connector 5 of the end block 3A through the relay connector 50.

A part of the terminals of the relay connector 50 is connected to the corresponding excitation coil 47 of the pilot valves 9a and 9b through a control circuit 61 (see FIGS. 9 to 11) formed in a printed-circuit board 51, and a current is passed to each excitation coil 47 from the relay connector 50. Accordingly, the relay connector 50, which doubles as a receiving connector, possesses not only the function of relaying for collective wiring and the function of receiving a current for the excitation coil 47 of each solenoid valve.

The details of the control circuit 61 are described later on the basis of FIGS. 9 to 11.

The printed-circuit board 51 is set up in the longitudinal direction at the tip of the center block 40a in the adapter block 40, and the control circuit 61 and the relay connector 50 are electrically connected by joining the lower end portion of the printed-circuit board 51 to the relay connector 50. Then, an individual receiving connector 52 for individual wiring is provided at a location close to the upper end portion of the printed-circuit board 51. The individual receiving connector 52 performs individual feeding to the solenoid valves 1 by connecting an individual feeding connector 53 from an external power supply, separately from collective feeding through the relay connector 50, the individual receiving connector 52 contains a plurality of receiving terminals 54 electrically connected to the control circuit, and these receiving terminals 54 are provided inside a rectangular connector insertion port 55 formed in an end wall portion 45 of the cover 41.

Furthermore, in the printed-circuit board 51, a switch 57 is attached at a neighboring location down from the individual receiving connector 52. The switch 57 is for switching the control circuit 61 to the collective wiring connection or the individual wiring connection, and, in the embodiment shown in the drawings, the mechanical switch 57 having an operator 57a is used. The operator 57a of the switch 57 protrudes outside the end wall portion 45 from a groove 45 formed in the vertical direction in the end wall portion 45 of the cover 41 and the switching operation can be performed from the outside.

On the external surface of the end wall portion 45, a switching member 58 is attached so as to be freely movable along the end wall portion 45. The switching member 58 is made of a plate-like member which is long and narrow in the vertical direction, the switching member 58 is provided between extension portions 42a and 42a extended from the left and right side wall portions 42 and 42 of the cover 41 to the outside of the end wall portion 45, and both edges are mated in guide grooves formed on the inner surfaces of the extension portions 42a and 43a in the vertical direction so as to freely slide. Accordingly, the switching member 58 can be made to linearly slide between a first operational position A shown FIGS. 2, 3, and 5 and a second operational position B shown FIGS. 6 to 8 by moving the switching member 58 along the guide grooves in the vertical direction.

Then, when the switching member 58 is shifted to the first operational position A by the upward operation, the connector insertion port 55 is covered by the switching member 58 and the connection of the individual feeding connector 53 to the individual receiving connector 52 becomes impossible. When the switching member 58 is shifted to the second operational position B by the downward operation, since the connector insertion port is made open to expose the receiving terminal 54 to the outside, the connection of the individual feeding connector becomes possible. Accordingly, as shown by a chain line in FIG. 7, the solenoid valve 1 can be individually connected to a power supply by connecting the individual feeding connector 53 to the individual receiving connector 52.

Furthermore, on the inner surface of the switching member 58, two latch portions 59a and 59b for switching the operator 57a of the switch 57 are provided with a spacing therebetween in the upward and downward direction and the operator 57a is positioned between the latch portions 59a and 59b. Then, when the switching member 58 is moved to the first operational position A shown in FIG. 3, the lower latch portion 59b is latched to the operator 57a near the end of the movement, and the control circuit 61 is switched to the collective wiring connection by the upward displacement of the operator 57a and by the switching of the first connecting position. When the switching member 58 is moved to the second operational position B shown in FIG. 7, the upper latch portion 59a is latched to the operator 57a near the end of the movement and the control circuit 61, in which the collective wiring connection is stopped, is switched to the individual wiring connection by the downward displacement of the operator 57a and by the switching of the second connecting position.

Thus, the switch 57 is automatically switched in response to the opening and closing operation of the connection insertion port 55 by the switching member 58 and the control circuit 61 is switched to the collective wiring connection or the individual wiring connection.

Figure 7:
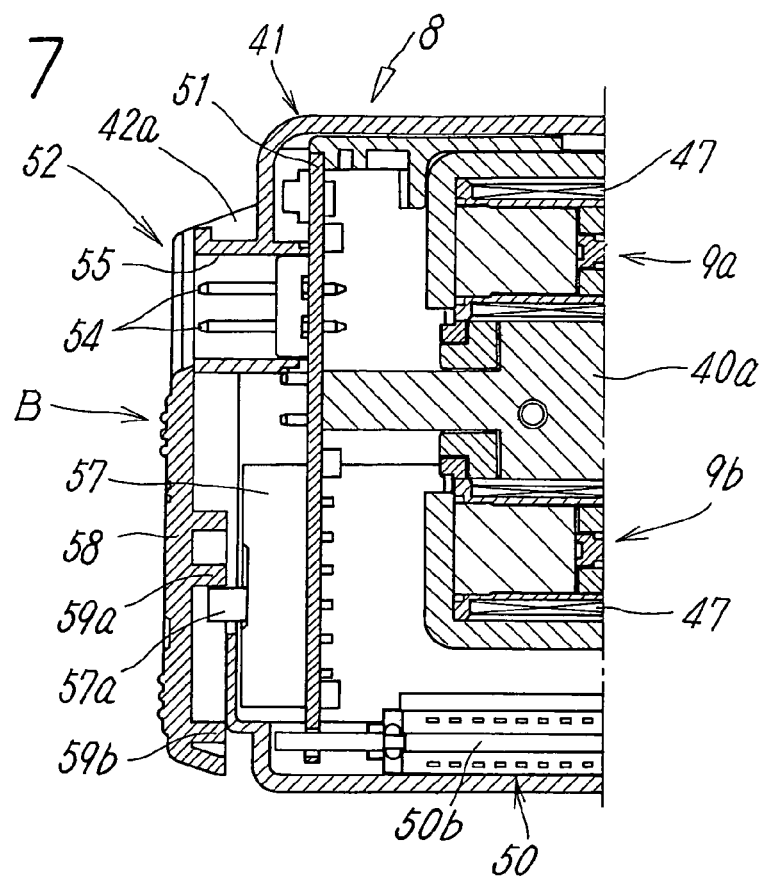
FIG. 7 is a sectional view of the solenoid valve in the state of FIG. 6.

Here, when the switching member 58 is shifted to the second operational position B in FIG. 7, while the individual feeding connector 53 is not connected to the individual receiving connector 52, the solenoid valve 1, that is, the control circuit 61 is not connected to the power supply for individual wiring, and simultaneously disconnected from the collective wiring power supply and the individual wiring power supply. In this way, there is an advantage in that an operational test of each solenoid valve 1 can be performed safely in such a way that, when the solenoid valve 1 is switched from the collective feeding state to the individual feeding state, both power supplies are once cut off by the operation of the switching member 58 and then, the individual feeding is started by connecting the individual feeding connector 53.

Furthermore, as shown in FIG. 7, when the switching member 58 is shifted to the second operational position B and the individual feeding connector 53 is connected to the individual receiving connector 52, the switching member 58 is locked at the second operational position B and cannot be shifted to the first operational position A in such a way that the tip portion of the switching member 58 is in contact with the side face of the individual feeding connector 53 and latched. In this way, since the control circuit is not simultaneously switched to the collective wiring connection and the individual wiring connection, it is very effective from the view point of prevention of electrical interference.

Figure 5:
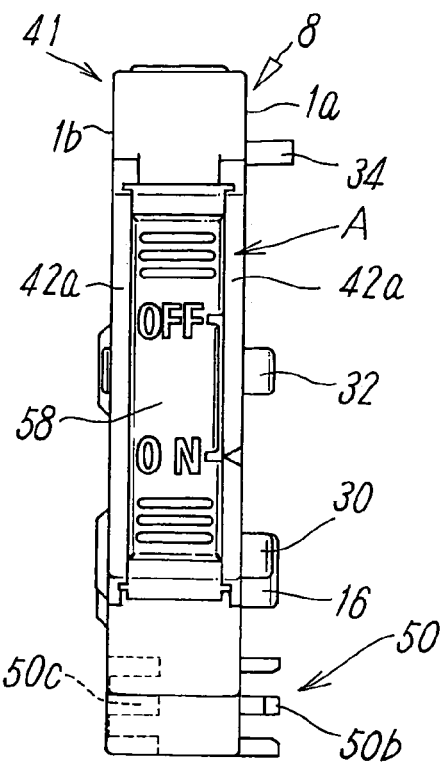
FIG. 5 is a left side view of the solenoid valve in FIG. 3.
Figure 6:
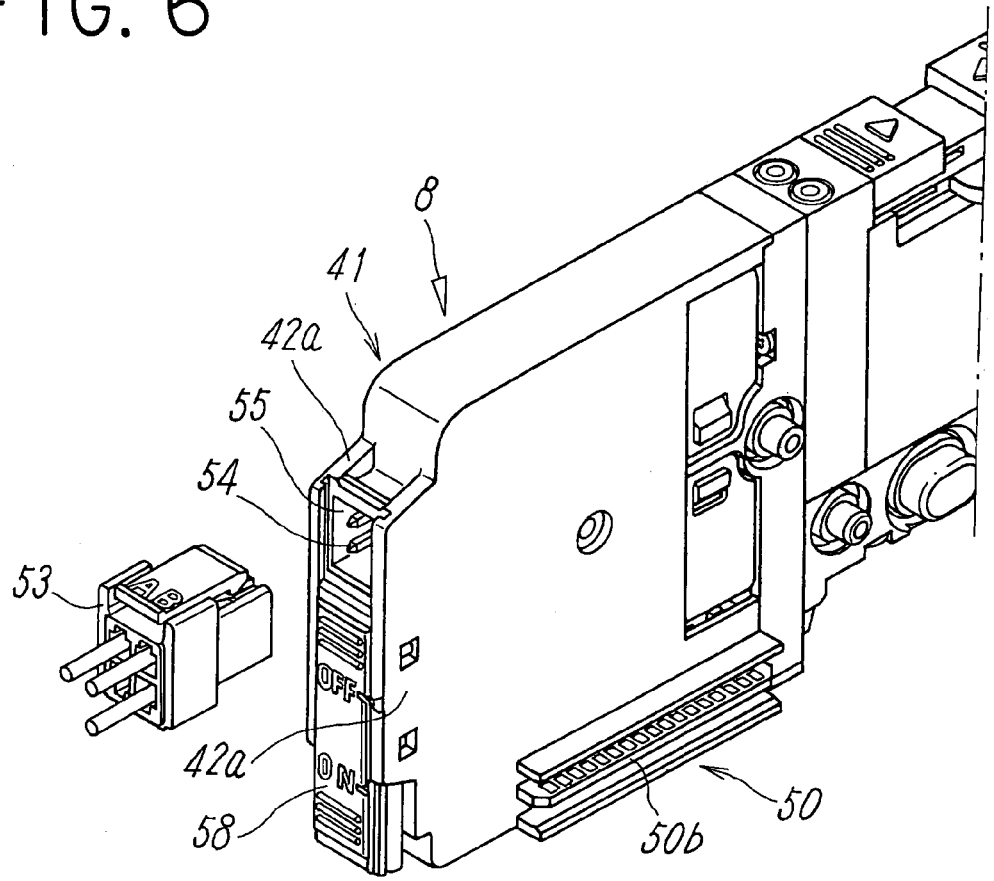
FIG. 6 is a perspective view of the essential part of a solenoid valve showing an individual feeding connector connected by shifting a switching member to the second operational position.
Figure 8:
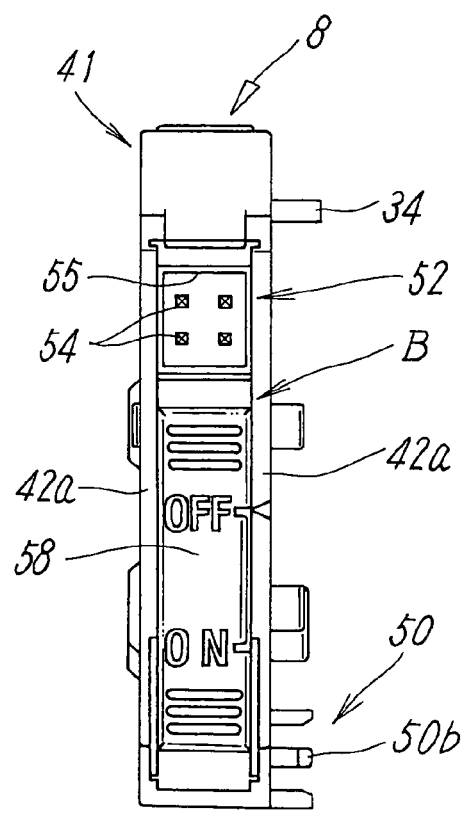
FIG. 8 is a left side view of the solenoid valve in FIG. 7.

Moreover, in the embodiment shown in the drawings, as shown in FIGS. 5 and 8, the markings of ON and OFF corresponding to the first operational position A and the second operational position B are given on the surface of the switching member 58, an arrow mark is provided on the edge of the extension portion 42a of the cover 41, and, when the switching member 58 is at the first operational position A, the arrow mark points to ON and, when the switching member 58 is at the second operational position B, the arrow mark points to OFF.

In the drawings, reference numeral 60 represents linear protrusion lines formed on the surface of the switching member 58 and, when the switching operation is performed, the protrusion lines prevent a finger from slipping.

Figure 9:
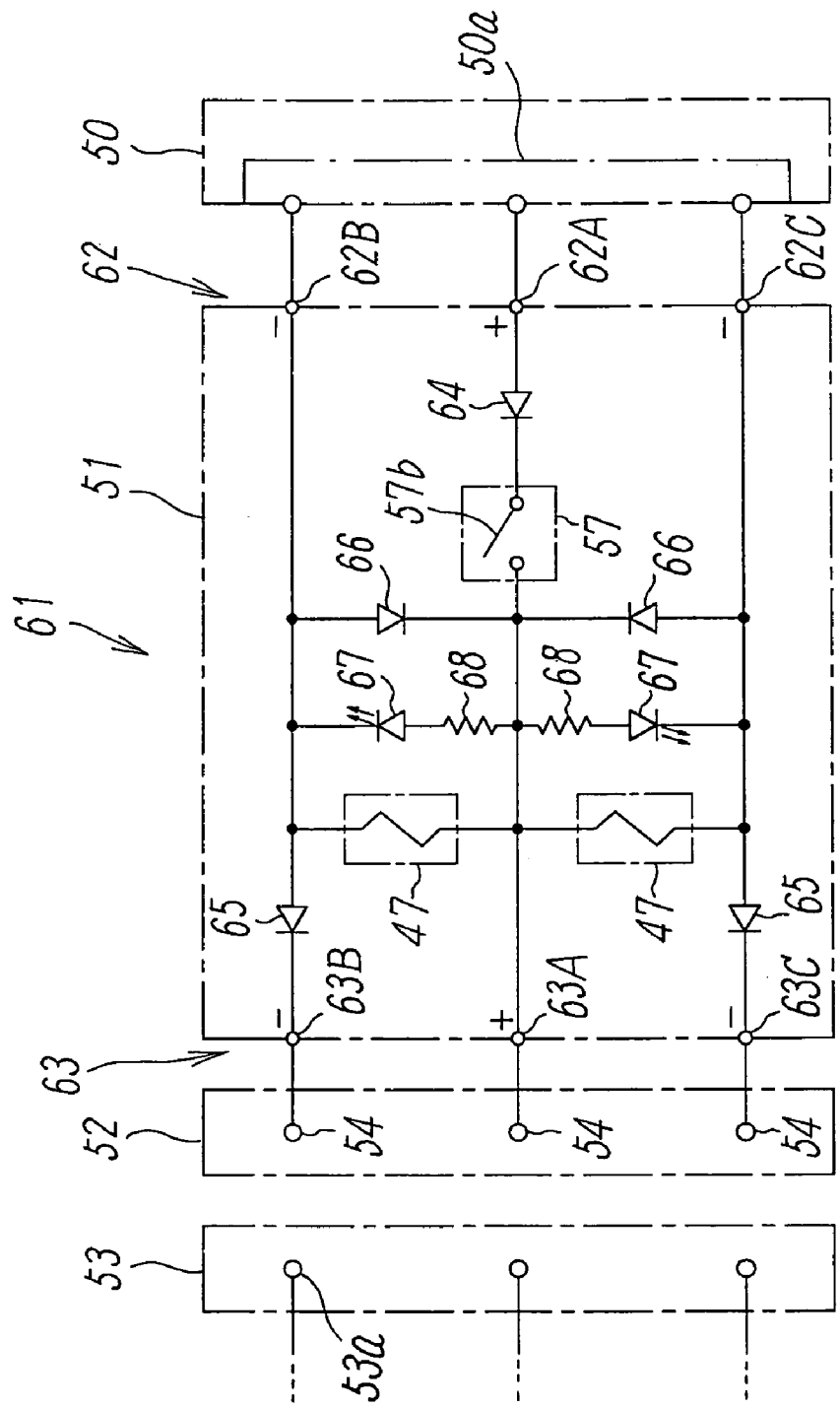
FIG. 9 shows the circuit structure of a first example of a control circuit.

In FIG. 9, a first example of the control circuit 61 formed on the printed-circuit board 51 is shown. The control circuit 61 contains a collective wiring terminal portion 62 to be connected to a part of the terminals 50a of the relay connector 50 and an individual wiring terminal portion 62 to be connected to the receiving terminals 54 of the individual receiving connector 52. These terminal portions 62 and 63 contain three of first to third terminals 62A, 62B, and 62C and 63A, 63B, and 63C, respectively, the first terminals 62A and 63A constitute common terminals to be commonly connected to the two excitation coils 47 and 47 of the solenoid coil 1, the other second terminals 62B and 63B and third terminals 62C and 63C constitute independent terminals to be individually connected to the excitation coils 47 and 47, the first terminals 62A and 63A are connected to the positive pole of a DC power supply, and the second terminals 62B and 63B and third terminals 62C and 63C are connected to the negative pole.

The first terminals 62A and 63A in the terminal portions 62 and 63 are connected to each other through a counter-electromotive-force-prevention diode 64, the forward direction of which is from the first terminal 62A on the collective wiring side to the first terminal 63A on the individual wiring side, and an opening and closing connection point 57b provided in the switch 57, and the second terminals 62B and 63B and the third terminals 62C and 63C are connected to each other, respectively, through a counter-electromotive-force-prevention diode 65, the forward direction of which is from the collective wiring side to the individual wiring side. The excitation coil 47, a counter-electromotive-force-prevention diode 66, and an LED 67 and a resistor 68 connected in series are connected in parallel between the first terminal 63A of the individual wiring terminal portion 63 and the second terminal 62B of the collective terminal portion 62 and between the first terminal 63A of the individual wiring terminal portion 63 and the third terminal 62C of the collective terminal portion 62.

In the control circuit 61 of the first example, since the first terminal 62A of the collective wiring terminal portion 62 is connected to the excitation coils 47 and 47 (solenoid valve 1) through the switch 47, when the switch 57 is made open-circuited by the movement of the switching member 58 to the second operational position B, the first terminal 62A is cut off from the excitation coils 47 and 47, and then, the control circuit 61 is cut off from the collectively receiving connector 50 and switched to the individual wiring connection. On the other hand, when the switching member 58 is shifted to the first operational position A and the switch 57 is closed-circuited, the first terminal 62A, that is, the collective wiring terminal portion 62 is made conductive to the excitation coils 47 and 47 and the control circuit 61 is switched to the collective wiring connection. At this time, although the terminals 63A, 63B, and 63C of the individual wiring terminal portion 63 are also connected to the excitation coils 47 and 47, since the individual receiving connector 52 is covered by the switching member 58 and the individual feeding connector 53 cannot be connected to the individual receiving connector 52, the control circuit 61 is practically cut off from the individual wiring power supply and the collective wiring connection is maintained.

Figure 10:
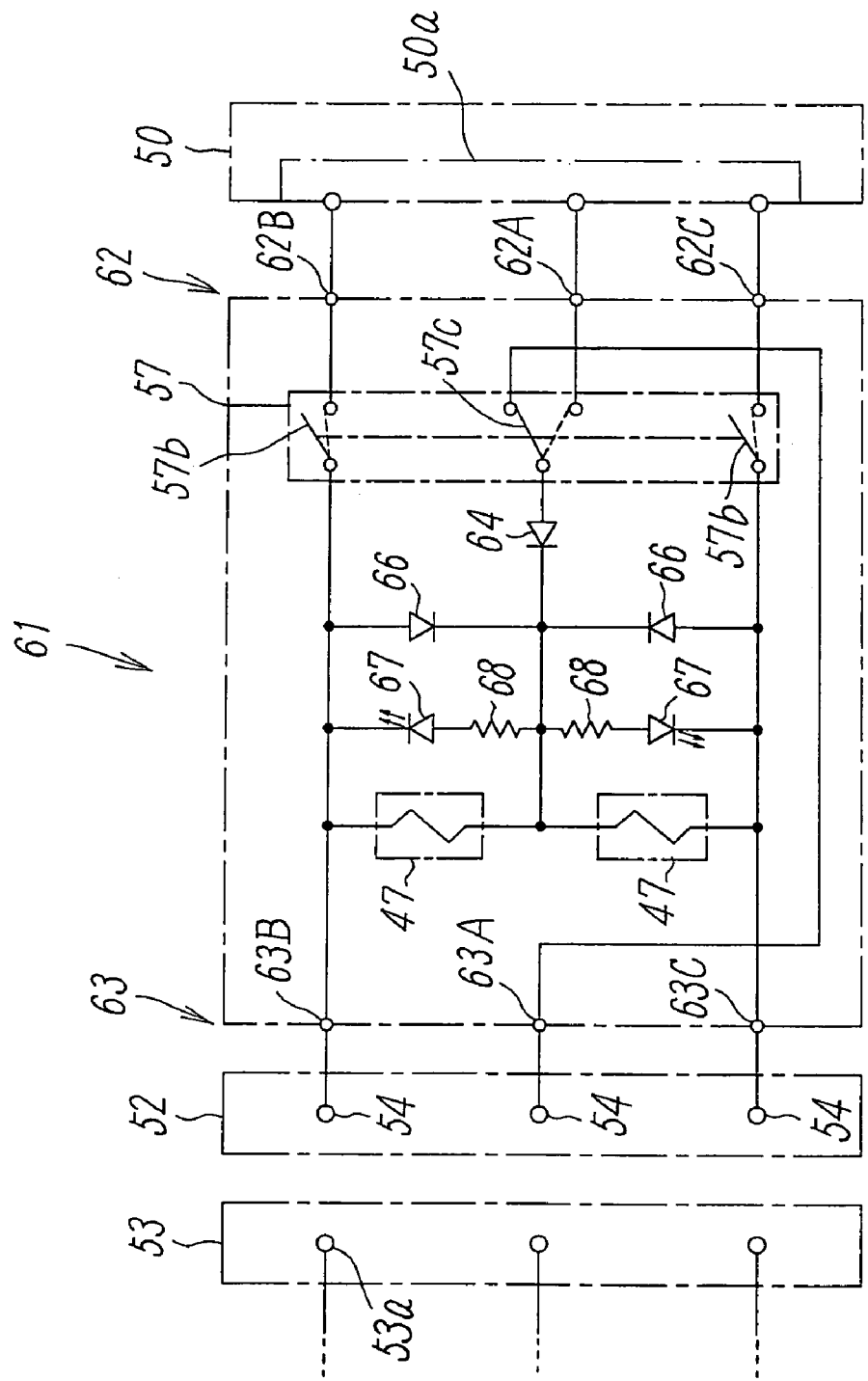
FIG. 10 shows the circuit structure of a second example of the control circuit.

FIG. 10 shows a second example of the control circuit. The main different points between the control circuit 61 and the control circuit 61 of the first example is in that the second terminal 62B and third terminal 62C in the collective wiring terminal portion 62 are connected to the excitation coils 47 and the second terminal 63B and third terminal 63C of the individual wiring terminal portion 63 through opening and closing contact portions 57b in the switch 57, respectively, and that the first terminal 62A of the collective wiring terminal portion 62 and the first terminal 63A of the individual wiring terminal portion 63 are selectively connected to the excitation coils 47 by a directional control contact portion 57c of the switch 57. Furthermore, the diode 65 provided in the control circuit 61 of the first example is eliminated.

Moreover, since the other construction is substantially the same as that of the control circuit 61 of the first example, the same construction portions are given the same reference numerals as in the first example and their description is omitted.

The three contact portions 57b, 57b, and 57b provided in the switch 57 operate in response to the switching member 58; when the switching member 58 is shifted to the first operational position A, as shown by a dotted line in FIG. 10, the two opening and closing contact portions 57b and 57b are closed-circuited and the directional control contact portion 57c makes the first contact 62A of the collective wiring terminal portion 62 connected to the excitation coils 47 and 47; and, as a result, the control circuit 61 is switched to the collective wiring connection. Furthermore, when the switching member 58 is shifted to the second operational position B, as shown by a solid line in FIG. 10, the two opening and closing contact portions 57b and 57b are made open-circuited and the directional control contact portion 57c makes the first contact 63A of the individual wiring terminal portion 63 connected to the excitation coils 47 and 47, and, as a result, the control circuit 61 is switched to the individual wiring connection.

Figure 11:
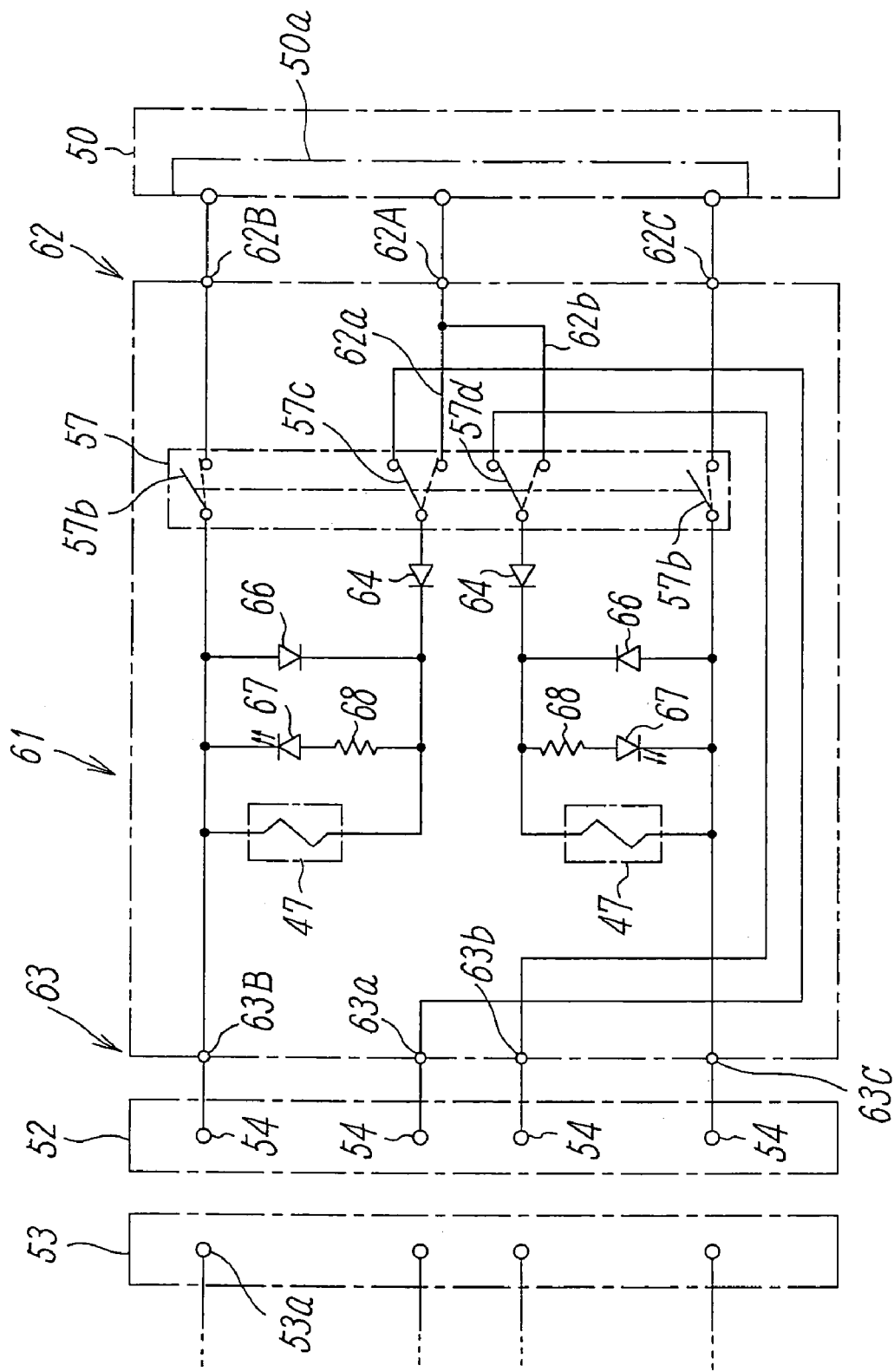
FIG. 11 shows the circuit structure of a third example of the control circuit.

FIG. 11 shows a third example of the control circuit. The main different points of the control circuit 61 from the control circuit 61 of the second example is in that, in the collective wiring terminal portion 62, the first terminal 62A as a common terminal out of the three terminals 62A, 62B, and 62C is made to branch into two branch terminals 62a and 62b and that, in the individual wiring terminal portion 63, instead of the first terminal 63A as a common terminal, independent terminals 63a and 63b are provided for the excitation coils 47 and 47. Then, a first branch terminal 62a and a first independent terminal 63a corresponding to one excitation coil 47 are connected to the excitation coil 47 through a directional control contact portion 57c of the switch, and a second branch terminal 62b and a second independent terminal 63b corresponding to the other excitation coil 47 are connected to the excitation coil 47 through a directional control contact portion 57d.

Accordingly, the number of the receiving terminals 54 in the individual receiving connector 52 is four, and the number of the feeding terminals 53a in the individual feeding connector 53 is also four.

Moreover, the fact that the second contact 62B and third contact 62c in the collective wiring terminal portion 62 are connected to the excitation coils 47 and 47 and the second contact 63B and the third contact 63C of the individual wiring terminal portion 63 through the opening and closing contact portions 57b and 57b, respectively, is the same as in the control circuit 61 of the second example. Furthermore, except for the above-described different points, the other circuit construction is substantially the same as in the control circuit of the second example, and accordingly, the same construction portions are given the same reference numerals as in the second example and their description is omitted.

The four contact portions 57b, 57b, 57c, and 57d in the switch 57 operate in response to the switching member 58. When the switching member 58 is shifted to the first operational position A, as shown by a dotted line in FIG. 11, the two opening and closing contact portions 57b and 57b are closed-circuited and directional control contact portions 57c and 57d are positioned to make the first branch terminal 62a of the collective wiring terminal portion 62 and the second terminal 62b connected to the excitation coils 47 and 47. When the switching member 58 is shifted to the second operational position B, as shown by a solid line in FIG. 11, the two opening and closing contact portions 57b and 57b are made open-circuited and the two directional control contact portions 57c and 57d are positioned to make the first independent terminal 63a and the second independent terminal 63b of the individual wiring terminal portion 63 connected to the excitation coils 47 and 47.

In the above embodiments, although a double pilot-operated solenoid valve having two pilot valves 9a and 9b is shown as a solenoid valve 1, even if one pilot-operated solenoid valve having only one pilot valve is used, the present invention can be applied.

The solenoid valve to which the present invention can be applied is not limited to five-port solenoids, and other solenoids, for example, three-port solenoids can be used.

Moreover, in the solenoid valve 1 in the first embodiment, collective wiring is performed in such a way that integration is performed by directly joining the solenoid valves to each other and that the relay connectors 50 are provided in the solenoid operation portion, and that these relay connectors 50 are directly connected between neighboring solenoid valves. However, even if solenoid valves to be mounted on a division type manifold base connected in a connected row arrangement are used, the present invention can be applied. In this case, the equipment to which the solenoid valves are joined is a manifold base.

Figure 12:
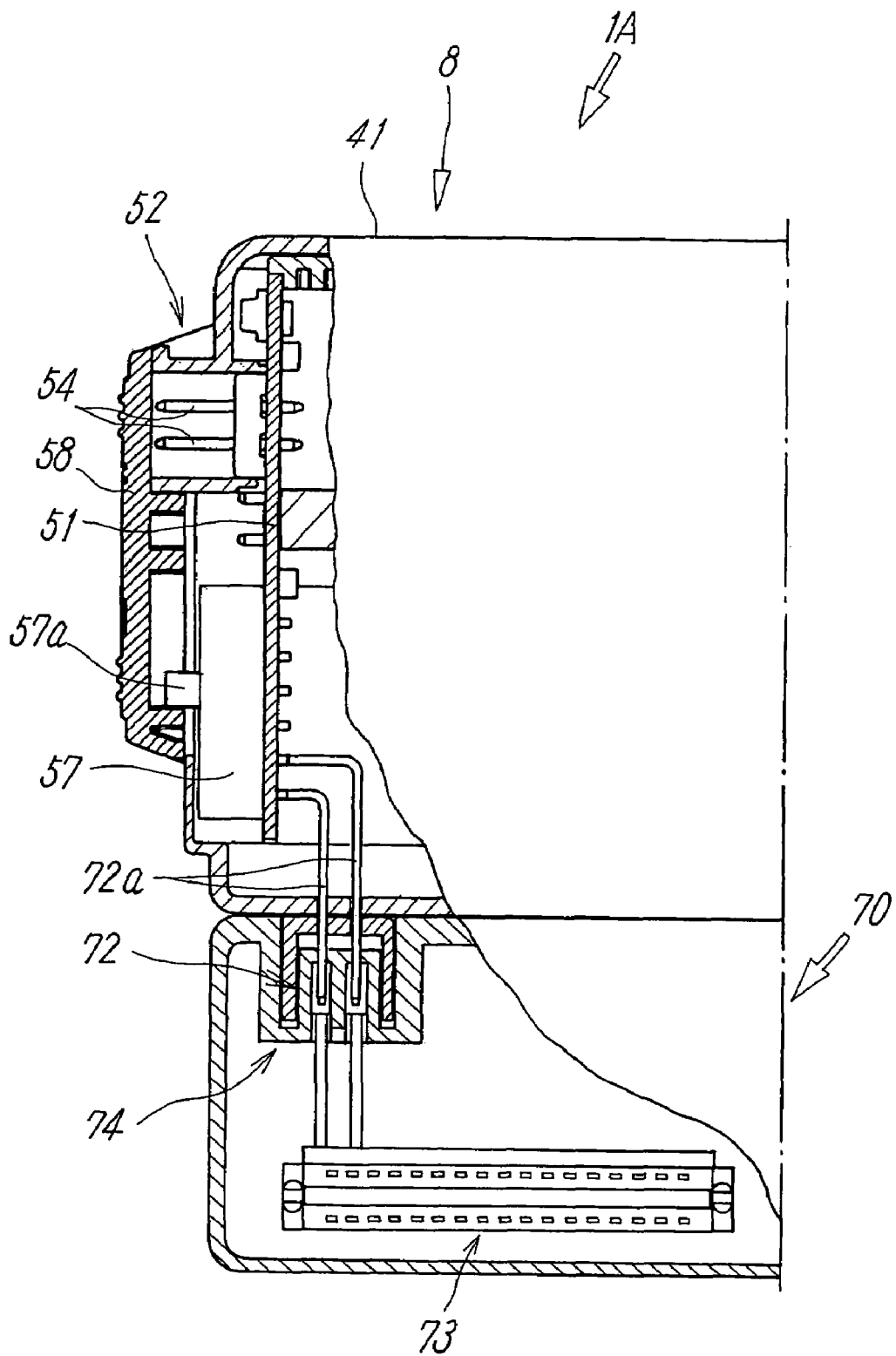
FIG. 12 is a sectional view of the essential part of a solenoid valve manifold in which a second embodiment of a solenoid valve of the present invention is mounted on a manifold base.

FIG. 12 shows the essential part of a solenoid manifold in which a solenoid valve 1A of the second embodiment of the present invention is mounted on a manifold base 70. The solenoid valve 1A contains a collective receiving connector 72 on the lower surface of the solenoid operation portion. The collective receiving connector 72 contains a plurality of receiving terminals 72a to be connected to the terminals 62A, 62B, and 62C of the collective wiring terminal portion 62 in the control circuit 62 shown in FIGS. 9 to 11, and the base end portions of these receiving terminals are electrically connected to the printed-circuit board 51.

On one hand, on the manifold base 71, a relay connector 73 is provided and the branch connector 74 to be connected to a part of terminals of the relay connector 73 is provided on the surface. The relay connector 73 has the same construction as the relay connector 50 of the solenoid valve 1 of the first embodiment and, when a plurality of manifold bases 70 are connected in a connected row arrangement, the relay connectors 73 of neighboring manifold bases are connected to each other. When the solenoid 1A is mounted on the manifold base 70, the branch connector 74 is made conductive to the solenoid valve 1A by being electrically connected to the collectively receiving connector 72 and, as a result, the branch connector 74 becomes a collective feeding connector for feeding a current to the solenoid valve.

As described above, although the solenoid valve 1A of the second embodiment does not contain the relay connector 50 as in the solenoid valve 1 of the first embodiment, except for this point and another point of the collective receiving connector 72 being provided, the structure of the individual receiving connector 52, the switching member 58, the switch 57, and others is substantially the same as that in the solenoid valve 1 of the first embodiment, and accordingly, the main same construction portions are given the same reference numerals as in the first embodiment and their description is omitted. Furthermore, since the basic structure as a solenoid valve manifold is the same as the publicly known one, its illustration and description are omitted here.

The invention claimed is:

1. A solenoid valve comprising:
   a main valve portion for switching a fluid flow path by operation of a valve member;
   a solenoid operation portion for making the valve member operates by a magnetic force generated by passing a current through an excitation coil;
   a control circuit having a collective wiring terminal portion connected to a power supply by collective wiring and an individual wiring terminal portion connected to the power supply by individual wiring, the control circuit being connected to the excitation coil;
   an individual receiving connector connected to the individual wiring terminal portion, the individual receiving connector being connected to an individual feeding connector from the power supply when individual wiring is performed;
   a switching member being able to be freely shifted between a first operational position where the connection of the individual feeding connector to the individual receiving connector is prohibited and a second operational position where the connection is allowed; and a switch operating in response to operation of the switching member, the switch for switching the control circuit to the collective wiring connection when the switching member is shifted to the first operational position and for switching the control circuit to the individual wiring connection when the switching member is shifted to the second operational position.

2. A solenoid valve as claimed in claim 1, wherein, when the switching member is shifted to the second operational position and the individual feeding connector is connected to the individual receiving connector, the switching member is locked at the second operational position.

3. A solenoid valve as claimed in claim 1, wherein the switch is a mechanical switch having an operator; the switching member is provided on the outer surface of a solenoid valve so as to be freely lineally shifted between the first operational position and the second operational position; when the switching member is shifted to the first operational position, the individual receiving connector is covered by the switching member and the connection of the individual feeding connector is prohibited, and simultaneously the operator of the switch is switched to a first connecting position and the control circuit is in a condition of the collective wiring; and when the switching member is shifted to the second operational position, the individual receiving connector is made open-circuited, and the connection of the individual feeding connector is allowed, and simultaneously the operator of the switch is switched to a second connecting position and the control circuit is in a condition of the individual wiring.

4. A solenoid valve as claimed in claim 2, wherein the switch is a mechanical switch having an operator; the switching member is provided on the outer surface of a solenoid valve so as to be freely lineally shifted between the first operational position and the second operational position; when the switching member is shifted to the first operational position, the individual receiving connector is covered by the switching member and the connection of the individual feeding connector is prohibited, and simultaneously the operator of the switch is switched to a first connecting position and the control circuit is in a condition of the collective wiring; and when the switching member is shifted to the second operational position, the individual receiving connector is made open-circuited, and the connection of the individual feeding connector is allowed, and simultaneously the operator of the switch is switched to a second connecting position and the control circuit is in a condition of the individual wiring.

5. A solenoid valve as claimed in any one of claims 1 to 4, wherein a collective terminal relay connector for collective wiring, in which a plurality of solenoid valves connected in a connected row arrangement is electrically connected to each other, is contained, and a part of terminals of the relay connector is connected to the collective wiring terminal portion.

6. A solenoid valve as claimed in any one of claims 1 to 4, wherein a collectively receiving connector electrically connected to the collective wiring terminal portion is contained, and, when the collectively receiving connector is mounted on a manifold base, the collectively receiving connector is connected to a collective feeding connector on the manifold base.

* * * * *